United States Patent

Hiromoto et al.

[11] Patent Number: 5,352,738
[45] Date of Patent: Oct. 4, 1994

[54] METHOD FOR PRODUCTION OF THERMOPLASTIC RESIN COMPOSITION AND GRAFT COPOLYMER

[75] Inventors: Yasuyuki Hiromoto; Hiroyuki Toh; Kouichi Matsuda; Hideo Goto, all of Ube, Japan

[73] Assignee: Ube Cycon, Ltd., Tokyo, Japan

[21] Appl. No.: 32,558

[22] Filed: Mar. 17, 1993

Related U.S. Application Data

[63] Continuation of Ser. No. 827,155, Jan. 28, 1992, abandoned.

[30] Foreign Application Priority Data

Mar. 4, 1991 [JP] Japan ................................. 3-037348

[51] Int. Cl.$^5$ ..................... C08L 23/16; C08L 25/12
[52] U.S. Cl. ......................... 525/70; 525/80; 525/227; 525/258; 525/240; 525/241
[58] Field of Search ............... 525/240, 241, 238, 227, 525/71, 80, 70

[56] References Cited

U.S. PATENT DOCUMENTS 4,762,882 8/1988 Okano et al. ................. 525/71
4,937,286 6/1990 Wingler et al. ................. 525/80

FOREIGN PATENT DOCUMENTS 63-175069 7/1988 Japan.
63-179965 7/1988 Japan.
63-182361 7/1988 Japan.
63-291913 11/1988 Japan.
63-291942 11/1988 Japan.
63-291943 11/1988 Japan.
2-123146 5/1990 Japan.

*Primary Examiner*—James J. Seidleck
*Assistant Examiner*—W. Robinson H. Clark
*Attorney, Agent, or Firm*—Kanesaka & Takeuchi

[57] ABSTRACT

A thermoplastic resin composition comprising 10 to 60 parts of a graft copolymer (A) and 90 to 40 parts of a rigid copolymer (B), both defined below:

(A) The graft copolymer obtained by emulsion graft polymerizing 60 to 20 parts of a specific monomer mixture in the presence of 40 to 80 parts (as solids) of an ethylene-propylene-non-conjugated diene copolymer-containing cross-linked latex containing 0.1 to 20 parts of a modified low molecular weight α-olefin copolymer in 100 parts of an ethylene-propylene-non-conjugated diene copolymer.

(B) The rigid copolymer containing 60 to 76% of an aromatic vinyl type monomer, 40 to 24% of a vinyl cyanide type monomer, and 0 to 30% of a monomer copolymerizable with these monomers.

In the production of the graft copolymer (A), a redox type initiator and a monomer mixture are added to the polymerization system continuously over a period of one hour.

10 Claims, No Drawings

METHOD FOR PRODUCTION OF THERMOPLASTIC RESIN COMPOSITION AND GRAFT COPOLYMER

This application is a continuation of application Ser. No. 827,155, filed Jan. 28, 1992, now abandoned.

BACKGROUND OF THE INVENTION

1. Field of the Invention

This invention relates to a thermoplastic resin composition and a graft copolymer, and more particularly to a thermoplastic resin composition incorporating therein a specific graft copolymer and a rigid copolymer, which is excellent in sliding property, surface gloss, surface appearance, and resistance to impacts, and exhibits high weatherability and a graft copolymer using the thermoplastic resin composition as a component and allowing a highly desirable graft copolymer of excellent quality to be produced stably in a high yield.

2. Description of the Prior Art

The graft copolymer obtained by copolymerizing styrene and acrylonitrile with an ethylene-propylene-nonconjugate diene copolymer and the rubber-reinforced resin obtained by mixing this graft copolymer with a copolymer composed of styrene and acrylonitrile called a rigid component have been heretofore known as "AES resin" and, because of their excellence in weatherability, resistance to impacts, and surface gloss, it is expected to find utility in a wide range of applications.

In recent years, in the fields of office machines, household electric appliances, and automobiles, a material of high slidability and self-lubricating property for use in keyboards, bearing materials, gear materials, etc has been required.

Generally, for the impartation of slidability and self-lubricating property to such thermoplastic resins as AES resins, there is adopted the method which comprises adding to the thermoplastic resin a lubricant such as silicone oil and a polyolefin resin such as polyethylene and melting and kneading them. For example, a slidable styrene type resin composition produced by mixing a rubber-modified styrene resin with a polyolefin type resin, a styrene-olefin graft copolymer, and dimethyl silicone (Japanese Patent Application Disclosure SHO 63(1988)-182,361) and a slidable material quality composition produced by melting and kneading a thermoplastic resin with a porous fluorine resin powder (Japanese Patent Application Disclosure SHO 63(1988)-179,965) have been proposed. A specific polyethylene component as an additive for improving the wear resistance of a synthetic resin has been proposed (japanese Patent Application Disclosure SHO 63(1988)-175,069).

The applicant of the present invention developed a method for stably producing a composition by emulsion polymerizing an aromatic vinyl type monomer and a vinyl cyanide type monomer with an ethylene-propylene-non-conjugated diene copolymer rubber latex having a specific gel content and applied this invention for patent under Japanese Patent Application Disclosure SHO 63(1988)-291,913. He also developed a resin composition possessing weatherability and excelling in impact resistance, heatproofness, and surface gloss and filed this invention for patent under Japanese Patent Application Disclosure SHO 63(1988)-291,942 and Japanese Patent Application Disclosure SHO 63(1988)-291,943.

The applicant further developed a method for stably grafting through a specific emulsion polymerization a maleimide type monomer, an aromatic vinyl type monomer, and a vinyl cyanide type monomer onto a modified low molecular weight α-olefin copolymer-containing ethylene-propylene-nonconjugate diene copolymer-containing cross-linked latex possessing high latex stability. He applied for patent under Japanese Patent Application Disclosure HEI 2(1990)-123,146 an invention concerning a resin composition obtained by the method described above and possessing outstanding heatproofness, rigidity, weatherability, and falling dart impact strength.

The method of the aforementioned conventional technique which incorporates a lubricant such as silicone oil and a polyolefin resin such as polyethylene in a thermoplastic resin by melting and kneading, however, has the disadvantage that the additives defy thorough dispersion and consequently induce impairment of the mechanical strength of the resin, and render it practically difficult to impart outstanding slidability, self-lubricating property, or surface appearance to the produced resin.

The compositions of Japanese Patent Application Disclosure SHO 63(1988)-291,913, SHO 63(1988)-291,942, and SHO 63(1988)-291,943 excell in weatherability, impact resistance, heatproofness, and surface gloss and yet offer lower slidability than normally required.

The resin composition obtained by the invention of Japanese Patent Application Disclosure HEI 2(1990)-123,146 is excellent in heatproofness, rigidity, weatherability, and falling dart impact strength and yet not fully satisfactory in slidability.

SUMMARY OF THE INVENTION

An object of this invention is to provide a thermoplastic resin composition which solves the drawbacks of the prior art described above, exhibits high slidability, excels in surface gloss and surface appearance, and enjoys weatherability.

Another object of this invention is to improve the methods of Japanese Patent Application Disclosure SHO 63(1988)-291,913 and Japanese Patent Application Disclosure HEI 2(1990)-123,146 and provide a method which enables a graft copolymer for use in the thermoplastic resin composition for the purpose mentioned above to be produced with high polymerization stability in a high yield.

The thermoplastic resin composition of the present invention comprises 10 to 60 parts by weight of a graft copolymer (A) and 90 to 40 parts by weight of a rigid copolymer (B), both defined below.

(A) The graft copolymer obtained by emulsion graft polymerizing, 60 to 20 parts by weight of a monomer mixture containing 60 to 76% by weight of an aromatic vinyl type monomer and 40 to 24% by weight of a vinyl cyanide type monomer relative to 40 to 80 parts by weight (as solids) of an ethylene-propylene-non-conjugated diene copolymer-containing cross-linked latex containing 0.1 to 20 parts by weight of a modified low molecular weight α-olefin copolymer, in 100 parts by weight of an ethylene-propylene-non-conjugated diene copolymer.

(B) The rigid copolymer containing 60 to 76% by weight of an aromatic vinyl type monomer, 40 to 24% by weight of a vinyl cyanide type monomer, and 0 to 30% by weight of a monomer copolymerizable with these monomers.

The method of this invention for the production of the graft copolymer, as recited in claim 1, resides in emulsion graft polymerizing the monomer mixture to the thermoplastic resin of a polyhydric alcohol-incorporated ethylene-propylene-non-conjugated diene copolymer-containing cross-linked latex, which method is characterized by continuously adding to the reaction system a redox type initiator in combination with the monomer mixture over a period of not less than one hour.

To be specific, the present inventors have continued a diligent study with a view to obtain a thermoplastic resin composition which exhibits high slidability, excels in surface gloss, surface appearance, and impact resistance, and enjoys weatherability, and find that a thermoplastic resin composition possessing truly outstanding characteristic properties are obtained by the incorporation of a specific graft copolymer containing a modified low molecular weight α-olefin copolymer and a rigid copolymer in specific proportions.

Further, with a view to obtain a method for efficient production of a modified low molecular weight α-olefin copolymer-containing graft copolymer to be used in the thermoplastic resin composition of high quality mentioned above, the inventors have conducted the following study.

The present inventors have already disclosed in japanese Patent Application Disclosure SHO 63(1988)-291,913 a method for stably producing the graft copolymer by emulsion polymerizing an aromatic vinyl type monomer and a vinyl cyanide type monomer to an ethylene-propylene-non-conjugated diene copolymer rubber latex having a specific gel content and further in Japanese Patent Application Disclosure HEI 2(1990)-123,146 a method for efficient production of a maleimide type graft copolymer containing a specific modified low molecular weight α-olefin copolymer.

The thermoplastic resin composition using the graft copolymer obtained by this method was found by the test for slidability to lack the quality satisfying the required properties.

They have continued a study for the purpose of solving this problem and found that for high slidability, uniform dispersion of a modified low molecular weight α-olefin copolymer in ethylene-propylene-non-conjugated diene copolymer rubber latex particles is important and, as means of attaining this uniform dispersion, the presence of a small amount of a polyhydric alcohol is effective. It has been further ascertained to them that when the ethylene-propylene-non-conjugated diene copolymer to be used in this case has an ethylene content fairly higher than the ordinary level the modified low molecular weight α- olefin copolymer is allowed to acquire enhanced compatibility with the ethylene-propylene-non-conjugated diene copolymer, attain uniform dispersion readily therein, and manifest an ample effect in imparting slidability thereto.

They have continued a study, based on this knowledge, in search of a method of emulsion polymerization which excels in polymerization stability, enjoys high yield of polymerization, and allows the resin composition using the produced graft copolymer to manifest highly desirable characteristic properties. They have consequently found that a graft copolymer possessing outstanding physical properties is obtained in a high yield by using an ethylene-propylene-non-conjugated diene copolymer-containing cross-linked latex uniformly containing a modified low molecular weight α-olefin copolymer and possessing specific gel content and particle diameter in the present of a small amount of a polyhydric alcohol in ethylene-propylene-non-conjugated diene copolymer latex particles possessing a specific ethylene content and adding an aromatic vinyl type monomer, a vinyl cyanide type monomer, a redox type initiator to the cross-linked latex over a specific period of time.

DESCRIPTION OF THE PREFERRED EMBODIMENTS

Now, the present invention will be described in detail below.

First, the thermoplastic resin composition of this invention will be described below.

The thermoplastic resin composition of this invention contains the aforementioned (A) graft copolymer and (B) rigid copolymer in specific proportions.

In the graft copolymer (A), the ethylene-propylene-non conjugated diene copolymer which is a rubber component (hereinafter referred to briefly as "EPDM") is a rubbery copolymer of ethylene, propylene, and a nonconjugate diene. The proportion of ethylene to be contained in the EPDM is desired to be in the range of 80 to 90 mol%. If this proportion is less than 80 mol%, the slidability aimed at is not obtained because the EPDM deficient in compatibility with the modified low molecular weight α-olefin copolymer which will be more specifically described hereinafter. If the proportion exceeds 90 mol%, the EPDM has the possibility of lowering the impact strength of the product. The non-conjugate diene component is desired to be 1,4-hexadiene, 5-ethylidene-2-norbornene, 5-vinyl norbornene, or dicyclopentadiene, for example.

As the modified low molecular weight α-olefin copolymer, an acid-modified polyethylene containing 99.8 to 80% by weight of an α-olefin and 0.2 to 20% by weight of an unsaturated carboxylic acid type compound may be cited. The α-olefin may be ethylene, for example. The unsaturated carboxylic acids which are effectively usable herein include acrylic acid, maleic acid, itaconic acid, itaconic acid, maleic anhydride, itaconic anhydride, and maleic acid monoamide, for example.

By having the modified low molecular weight α-olefin copolymer incorporated in the aforementioned EPDM in an amount of not less than 0.1 part by weight, based on 100 parts of the EPDM, the finally produced thermoplastic resin composition is allowed to acquire enhanced slidability and to improve stability of the prepared EPDM-containing cross-linked latex. If the content of the modified low molecular weight α-olefin copolymer exceeds 20 parts by weight, however, the EPDM induces a notable decline in impact strength. In the present invention, therefore, the EPDM-containing cross-linked latex is to incorporate therein 0.1 to 20 parts by weight of the modified low molecular weight α-olefin copolymer, based on 100 parts by weight of the EPDM.

For the sake of the balance among the physical properties of the final product, the EPDM-containing cross-linked latex preferably has a gel content in the range of from 40 to 95% by weight and a particle diameter in the range of from 0.2 to 1 μm. If the gel content is less than 40% by weight, the finally produced thermoplastic resin composition is deficient in impact resistance and surface appearance. If the gel content exceeds 95% by weight, the finally produced thermoplastic resin composition has the possibility of suffering from conspicuous deficiency in impact resistance. If the particle diameter is less than 0.2 μm, the finally produced thermoplastic resin composition betrays serious deficiency in impact resistance. If the particle diameter exceeds 1 μm, the produced resin composition has the possibility of suffering from deficiency in gloss and surface appearance.

The monomer mixture to be graft polymerized to the EPDM is the mixture of an aromatic vinyl type monomer and a vinyl cyanide type monomer. As examples of the aromatic vinyl type monomer, styrene, α-methyl styrene, and p-methyl styrene may be cited. As examples of the vinyl cyanide type monomer, acrylonitrile and methacrylonitrile may be cited.

The monomer mixture for this invention is to contain 60 to 76% by weight of an aromatic vinyl type monomer and 40 to 24% by weight of a vinyl cyanide type monomer.

The graft copolymer of (A) is obtained by emulsion graft polymerizing 60 to 20 parts by weight of the aforementioned monomer mixture to 40 to 80 parts by weight (as solids) of the EPDM-containing cross-linked latex containing 0.1 to 20 parts by weight of the modified low molecular weight α-olefin copolymer in 100 parts by weight of the aforementioned EPDM. The slidability of the finally produced composition is not improved when the content of the EPDM-containing cross-linked latex of the graft copolymer is less than 40 parts by weight and that of the monomer mixture exceeds 60 parts by weight. The graft copolymer is deficient in surface gloss and surface appearance if the content of the EPDM-containing cross-linked latex exceeds 80 parts by weight and that of the monomer mixture is less than 20 parts by weight.

The rigid copolymer of (B) is to contain 60 to 76% by weight of an aromatic vinyl type monomer, 40 to 24% by weight of a vinyl cyanide type monomer, and 0 to 30% by weight of a monomer copolymerizable with the monomers. Desirable examples of the aromatic vinyl type monomer and the vinyl cyanide type monomer have been already described. As examples of the copolymerizable monomer, N-phenyl maleimide, methacrylates, and methyl methacrylate may be cited. The copolymerizable monomer is not always required. This invention tolerates absence of this copolymerizable monomer.

The thermoplastic resin composition of this invention is to contain 10 to 60 parts by weight of the graft copolymer of (A) and 90 to 40 parts by weight of the rigid copolymer of (B). Preferably, the total amount of (A) and (B) is 100 parts by weight. The slidability aimed at is not obtained and the impact resistance is inferior if the amount of the graft copolymer is less than 10 parts by weight and that of the rigid copolymer exceeds 90 parts by weight. The surface gloss and the surface appearance are poor if the amount of the graft copolymer exceeds 60 parts by weight and that of the rigid copolymer is less than 40 parts by weight.

The thermoplastic resin composition of this invention constructed as described above is easily produced by mixing the graft copolymer of (A) and the rigid copolymer of (B) in the prescribed amounts, when necessary, in combination with anti-oxidant, lubricant, processing auxiliary, pigment, filler, etc. by the use of an extruding device, a Banbury mixer, or a kneading roll and pelletizing the mixture.

The method of this invention for the production of the graft copolymer is usable advantageously for the production of the graft copolymer which is the raw material for the production of the thermoplastic resin composition of this invention. Now, the method for the production of the graft copolymer of this invention will be described below.

In accordance with the present invention, the production of the graft copolymer is desired to be carried out as follows.

First, an EPDM latex having the modified low molded molecular weight α-olefin copolymer uniformly dispersed therein is prepared by using the EPDM, the modified low molecular weight α-olefin copolymer, and a polyhydric alcohol. Specifically, the prescribed amounts of the EPDM and the modified low molecular weight α-olefin copolymer are dissolved in a suitable solvent, the resultant solution is emulsified by the addition thereto of an emulsifier, and the produced emulsion is combined with the polyhydric alcohol. In this case, an aliphatic or alicyclic hydrocarbon solvent such as, for example, n-hexane or cyclohexane can be used as the solvent in this case. Though the emulsifier is not particularly restricted, an anionic surfactant such as potassium oleate or potassium salt of rosin may be used. Examples of the polyhydric alcohol usable effectively herein include ethylene glycol, tetramethylene glycol, and glycerin.

The amount of the emulsifier to be added is desired to be in the range of from 1 to 10 parts by weight, based on the amount of the EPDM. The incorporation of the emulsifier may be accomplished by preparatorily mixing the oleic acid with the EPDM and the modified low molecular weight α-olefin copolymer and adding an aqueous potassium hydroxide to the resultant mixture thereby giving rise to potassium oleate therein.

Desirably, the amount of the polyhydric alcohol to be added is in the range of from 0.1 to 1 part by weight. The polyhydric alcohol thus added contributes to enhance the uniformity of the dispersion of the modified low molecular weight α-olefin copolymer on the EPDM latex particles.

The amount of the modified low molecular weight α-olefin copolymer to be incorporated is in the range of from 0.1 to 20 parts by weight, based on 100 parts by weight of the EPDM. When the modified low molecular weight α-olefin copolymer is incorporated in this proportion in the EPDM, the graft polymerization is carried out stably and the finally produced resin composition is allowed to acquire highly desirable slidability.

A latex having a particle diameter approximately in the range of from 0.2 to 1 μm is obtained by emulsifying the solution of the EPDM and the modified low molecular weight α-olefin copolymer with an emulsifier, thoroughly stirring the resultant emulsion, and distilling the stirred mixture thereby expelling the solvent.

Then, a cross-linked latex is prepared by mixing 100 parts by weight of the EPDM latex with 0.1 to 5.0 parts by weight of a polyfunctional compound such as divinyl benzene and 0.1 to 5.0 parts by weight of an organic peroxide such as di-t-butyl- per oxytrimethyl cyclohexane and allowing them to react at a temperature in the range of from 60° C. to 140° C. for a period approximately in the range of from 0.5 to 5.0 hours.

In this invention, the EPDM-containing cross-linked latex prepared as described above is desired to have a gel content approximately in the range of from 40 to 95% by weight, as described above. Incidentally, the gel content of the cross-linked latex can be determined by coagulating this latex with dilute sulfuric acid, washing and drying the precipitate taking 1g of the dried precipitate as a sample, immersing this sample in 200 ml of toluene for 40 hours, filtering the wet sample with a 200-mesh stainless steel gauze, and drying the residue stopped on the gauze.

Subsequently, 40 to 80 parts by weight (as solids) of the cross-linked latex thus prepared and 60 to 20 parts by weight of a monomer mixture containing 60 to 76% by weight of an aromatic vinyl type monomer and 40 to 24% by weight of a vinyl cyanide type monomer are subjected to graft polymerization at a proper polymerization temperature.

In accordance with the method of this invention, it is necessary that the monomer mixture should be mixed with a redox initiator and the resultant mixture continuously added to the polymerization system over a period of not less than one hour. If the period of this addition is less than one hour, the latex stability is impaired and the polymerization yield is declined.

The redox type initiator to be used herein is desired to be an oil-soluble organic peroxide. In an ordinary case, a combination of ferrous sulfate, a chelating agent, and a reducing agent is used. The oil-soluble initiator is desired to be an organic peroxide such as, for example, cumene hydroperoxide, diisopropyl benzene peroxide, or tertiary butyl hydroperoxide. The redox type initiator is particularly desired to be composed of cumene hydroperoxide, ferrous sulfate, sodium pyrophosphate, and dextrose.

The graft copolymer obtained after the completion of the polymerization, when necessary, may incorporate therein an antioxidant. Then, the produced graft copolymer latex is caused to precipitate resin solids. As the precipitant in this case, the aqueous solutions of sulfuric acid, acetic acid, calcium chloride, and magnesium sulfate are used either singly or in the form of a combination of two or more members. From the graft copolymer latex in which the precipitant has been incorporated, the graft copolymer can be obtained by heating and stirring the graft copolymer latex, separating the precipitate, and washing the separated precipitate with water, dehydrating the washed precipitate, and drying it.

Now, the method for the production of the rigid copolymer of (B) to be used in this invention will be described.

For the production of the rigid copolymer of (B), the method of polymerization such as emulsion polymerization or suspension polymerization is adopted.

When this rigid copolymer is synthesized by emulsion polymerization, the ordinary emulsion polymerization quality emulsifier such as potassium salt of rosin or alkylbenzene sodium sulfonate can be used. As the polymerization initiator, an organic or inorganic peroxide type initiator may be used. As the chain transfer agent, mercaptans, α-methylstyrene dimer, and terpenes are usable.

When the rigid copolymer is synthesized by suspension polymerization, the suspending agent to be used therein may be tricalcium phosphate or polyvinyl alcohol. As the suspension auxiliary, alkylbenzene sodium sulfonate can be used. As the initiator, an organic peroxide is used. As the chain transfer agent, mercaptans, α-methylstyrene dimer, and terpenes are available.

The synthesis of the rigid copolymer is accomplished by mixing the component mixtures in prescribed amounts and subjecting the resultant mixture to polymerization as combined with suitable emulsifier, initiator, and chain transfer agent. Then, in the case of the rigid resin latex obtained by emulsion polymerization, solid parts of the resin are precipitated. As the precipitant in this case, the aqueous solutions of sulfuric acid, acetic acid, calcium chloride, and magnesium sulfate can be used either singly or in the form of a combination of two or more members. The precipitate, when necessary, is washed with water, dehydrated, and dried, to give rise to a rigid copolymer.

The thermoplastic resin composition provided by the present invention preeminently excels in such properties as sliding quality, surface gloss, surface appearance, impact resistance, and weatherability, exhibits good balance among these properties, and enjoys extremely high quality.

Further, by the method of this invention for the production of the graft copolymer, a graft copolymer possessing excellent properties is made the thermoplastic resin composition of this invention is produced with high polymerization stability in a high yield.

Now, the present invention will be described more specifically with reference to production examples, working examples, and comparative experiments. This invention is not limited to these working examples but may be practised otherwise without departing from the spirit of the invention disclosed herein. Wherever the term "parts" is mentioned herein, it shall be construed as referring to "parts by weight."Production 1: Production of EPDM-containing cross-linked latex One hundred parts of EPDM (ethylene content 82 mol%; produced by Mitsui Petrochemical Industries, Ltd. and marketed under product code of "EPT3012P") was dissolved in 566 parts of n-hexane. In the resultant solution, various amounts modified polyethylene (produced by Mitsui Petrochemical Industries, Ltd. and marketed under trademark designation of "High Wax 2203A" having a molecular weight of 2,700) indicated in Table 1 added thereto and oleic acid further added thereto were thoroughly dissolved. Separately, an aqueous solution having 0.9 part of KOH dissolved in 700 parts of water and 0.5 part of ethylene glycol added thereto were kept at 60° C. and the polymer solution prepared in advance as described above was gradually added thereto and emulsified therein. Thereafter, the emulsion was stirred with a homogenizing mixer. Subsequently, the resultant mixture was distilled to expel the solvent and part of the water and obtain a latex having a particle diameter in the range of from 0.4 to 0.6 μm. To this latex (100 parts of EPDM as a rubber component), 1.5 part of divinyl benzene, and 1.0 part of di-t-butylperoxytrimethyl cyclohexane were added and left reacting at 120° C. for one hour, to prepare EPDM-containing cross-linked latexes No. 1—1 to No. 1—4 shown in Table 1.

The EPDM-containing cross-linked latex No. 1—5 is a product obtained by following the procedure described above, excepting the addition of ethylene glycol was omitted.

The EPDM-containing cross-linked latex No. 1—6 is a product obtained by following the same procedure, excepting 100 parts of EPDM (ethylene content 72 mol %; produced by Mitsui Petrochemical Industries, Ltd. and marketed under product code of "EPT4045") was used instead. The EPDM-containing cross-linked latexes No. 1—7 and No. 1—8 are products obtained by following the same procedure, excepting the di-t-butyl-peroxytrimethylcyclohexane was used in respective amounts of 0.2 part and 3.0 parts instead.

The EPDM-containing cross-linked latexes No. 1-9 and No. 1-10 are products obtained by following the same procedure, excepting the oleic acid was used in respective amounts of 7.0 parts and 2.0 parts.

These EPDM-containing cross-linked latexes were tested for gel content by a procedure of solidifying a given latex with dilute sulfuric acid, washing the resultant solid with water, drying the washed solid, taking a 1-g portion of the dried solid as a sample, immersing this sample in 200 ml of toluene for 40 hours, filtering the wet sample through a 200-mesh stainless steel gauze, and drying the residue stopped on the gauze. The results are shown in Table 1. Further, the EPDM-containing cross-linked latexes were tested for particle diameter by the use of a particle size distribution tester (produced by Horiba and marketed under product code of "CAPA-500"). The results were as shown in Table 1.

Production 2: Production of graft copolymer

In a polymerization tank made of stainless steel and provided with a stirrer, raw materials of a varying formula indicated in No. 2-1 to No. 2-12 in Table 2 and Table 3 were placed and polymerized. The polymerization temperature was fixed at 80° C. The time for the addition of the component II was 150 minutes and that for the addition of the component III was 180 minutes.

After the polymerization, the polymerization mixture having an antioxidant added thereto was caused to precipitate solids by addition of sulfuric acid. The solids were washed, dehydrated, and dried. Thus graft copolymer powders No. 2-1 to No. 2-12 were obtained.

The conversions of monomers and the amounts of solids precipitated in the production of these graft copolymers No. 2-1 to No. 2-12 are shown in Table 2 and Table 3. The conversion of a monomer was calculated from the residual monomer found by subjecting part of a given latex to gas chromatography. The latexes were evaluated for stability based on the amount of solids precipitated.

TABLE 1

| EPDM-Containing Latex No. | 1-1 | 1-2 | 1-3 | 1-4 | 1-5 | 1-6 | 1-7 | 1-8 | 1-9 | 1-10 |
|---|---|---|---|---|---|---|---|---|---|---|
| Composition (parts) | | | | | | | | | | |
| Emulsification | | | | | | | | | | |
| EPDM (3012P) | 100 | 100 | 100 | 100 | 100 | 0 | 100 | 100 | 100 | 100 |
| EPDM (3045) | 0 | 0 | 0 | 0 | 0 | 100 | 0 | 0 | 0 | 0 |
| Acid-modified polyethylene | 0 | 1 | 10 | 25 | 10 | 10 | 10 | 10 | 10 | 10 |
| n-Hexane | 566 | 566 | 566 | 566 | 566 | 566 | 566 | 566 | 566 | 566 |
| Ethylene glycol | 0.5 | 0.5 | 0.5 | 0.5 | 0 | 0.5 | 0.5 | 0.5 | 0.5 | 0.5 |
| Oleic acid | 4.5 | 4.5 | 4.5 | 4.5 | 4.5 | 4.5 | 4.5 | 4.5 | 7.0 | 2.0 |
| Water | 700 | 700 | 700 | 700 | 700 | 700 | 700 | 700 | 700 | 700 |
| KOH | 0.9 | 0.9 | 0.9 | 0.9 | 0.9 | 0.9 | 0.9 | 0.9 | 1.4 | 0.4 |
| Cross-linking | | | | | | | | | | |
| Divinyl benzene | 1.5 | 1.5 | 1.5 | 1.5 | 1.5 | 1.5 | 1.5 | 1.5 | 1.5 | 1.5 |
| Di-t-butyl-peroxy-tri-methyl cyclohexane | 1.0 | 1.0 | 1.0 | 1.0 | 1.0 | 1.0 | 0.2 | 3.0 | 1.0 | 1.0 |
| Gel content (% by weight) | 73 | 71 | 69 | 71 | 72 | 70 | 13 | 98 | 71 | 68 |
| Particle diameter ($\mu$m) | 0.52 | 0.63 | 0.57 | 0.48 | 0.55 | 0.54 | 0.53 | 0.55 | 0.18 | 1.50 |
| Remarks | Comparative experiment | Example | Example | Comparative experiment | Comparative experiment | Comparative experiment | Comparative experiment | Comparative experiment | Comparative experiment | Comparative experiment |

TABLE 2

| No. | 2-1 | 2-2 | 2-3 | 2-4 | 2-5 | 2-6 |
|---|---|---|---|---|---|---|
| Composition I (parts) | | | | | | |
| EPDM Latex No. (as solids) | | | | | | |
| 1-1 | 70 | | | | | |
| 1-2 | | 70 | | | | |
| 1-3 | | | 70 | | | |
| 1-4 | | | | 70 | | |
| 1-5 | | | | | 70 | |
| 1-6 | | | | | | 70 |
| 1-7 | | | | | | |
| 1-8 | | | | | | |
| 1-9 | | | | | | |
| 1-10 | | | | | | |

TABLE 2-continued

| No. | 2-1 | 2-2 | 2-3 | 2-4 | 2-5 | 2-6 |
|---|---|---|---|---|---|---|
| Composition I (parts) | | | | | | |
| EPDM Latex No. (as solids) | | | | | | |
| Water (inclusive of water contained in the latex) | 170 | 170 | 170 | 170 | 170 | 170 |
| Sodium hydroxide | 0.01 | 0.01 | 0.01 | 0.01 | 0.01 | 0.01 |
| Sodium pyrophosphate | 0.45 | 0.45 | 0.45 | 0.45 | 0.45 | 0.45 |
| Ferrous sulfate | 0.01 | 0.01 | 0.01 | 0.01 | 0.01 | 0.01 |
| Dextrose | 0.57 | 0.57 | 0.57 | 0.57 | 0.57 | 0.57 |
| Composition II (parts) | | | | | | |
| Acrylonitrile | 9 | 9 | 9 | 9 | 9 | 9 |
| Styrene | 21 | 21 | 21 | 21 | 21 | 21 |
| CHP | 1.0 | 1.0 | 1.0 | 1.0 | 1.0 | 1.0 |
| Composition III (parts) | | | | | | |
| Sodium pyrophosphate | 0.45 | 0.45 | 0.45 | 0.45 | 0.45 | 0.45 |
| Ferrous sulfate | 0.01 | 0.01 | 0.01 | 0.01 | 0.01 | 0.01 |
| Dextrose | 0.56 | 0.56 | 0.56 | 0.56 | 0.56 | 0.56 |
| Sodium oleate | 1.0 | 1.0 | 1.0 | 1.0 | 1.0 | 1.0 |
| Water | 30 | 30 | 30 | 30 | 30 | 30 |
| Reaction temperature (°C.) | 80 | 80 | 80 | 80 | 80 | 80 |
| Conversion of monomer (%) | 92 | 92 | 93 | 93 | 92 | 91 |
| Amount of solids educed (% by weight) | 0.52 | 0.38 | 0.28 | 0.24 | 0.31 | 0.33 |
| Remarks | Comparative experiment | Example | Example | Comparative experiment | Comparative experiment | Comparative experiment |

TABLE 3

| No. | 2-7 | 2-8 | 2-9 | 2-10 | 2-11 | 2-12 |
|---|---|---|---|---|---|---|
| Composition I (parts) | | | | | | |
| EPDM Latex No. (as solids) | | | | | | |
| 1-1 | | | | | | |
| 1-2 | | | | | | 30 | 90 |
| 1-3 | | | | | | |
| 1-4 | | | | | | |
| 1-5 | | | | | | |
| 1-6 | | | | | | |
| 1-7 | 70 | | | | | |
| 1-8 | | 70 | | | | |
| 1-9 | | | 70 | | | |
| 1-10 | | | | 70 | | |
| Water (inclusive of water contained in the latex) | 170 | 170 | 170 | 170 | 170 | 170 |
| Sodium hydroxide | 0.01 | 0.01 | 0.01 | 0.01 | 0.01 | 0.01 |
| Sodium pyrophosphate | 0.45 | 0.45 | 0.45 | 0.45 | 1.05 | 0.45 |
| Ferrous sulfate | 0.01 | 0.01 | 0.01 | 0.01 | 0.02 | 0.01 |
| Dextrose | 0.57 | 0.57 | 0.57 | 0.57 | 1.33 | 0.57 |
| Composition II (parts) | | | | | | |
| Acrylonitrile | 9 | 9 | 9 | 9 | 21 | 3 |
| Styrene | 21 | 21 | 21 | 21 | 49 | 7 |
| CHP | 1.0 | 1.0 | 1.0 | 1.0 | 2.33 | 0.33 |
| Composition III (parts) | | | | | | |
| Sodium pyrophosphate | 0.45 | 0.45 | 0.45 | 0.45 | 1.05 | 0.15 |
| Ferrous sulfate | 0.01 | 0.01 | 0.01 | 0.01 | 0.02 | 0.01 |
| Dextrose | 0.56 | 0.56 | 0.56 | 0.56 | 1.30 | 0.19 |
| Sodium oleate | 1.0 | 1.0 | 1.0 | 1.0 | 1.0 | 1.0 |
| Water | 30 | 30 | 30 | 30 | 30 | 30 |
| Reaction temperature (°C.) | 80 | 80 | 80 | 80 | 80 | 80 |
| Conversion of monomer (%) | 90 | 92 | 93 | 92 | 92 | 91 |
| Amount of solids educed (% by weight) | 0.22 | 0.31 | 0.20 | 0.22 | 0.25 | 0.32 |
| Remarks | Comparative experiment | Comparative experiment | Comparative experiment | Comparative experiment | Comparative experiment | Comparative experiment |

Production 3: Production of rigid copolymer

In an autoclave provided with a stirrer and subjected to thorough displacement of the entrapped air with nitrogen gas, monomers, distilled water, suspension stabilizer, and organic peroxide were placed in respective amounts indicated in Table 4, stirred at a rate of 350 rpm and heated until the inner temperature rose to 80° C. and left polymerizing at this temperature for nine hours.

Subsequently, the polymerization mixture was heated until the inner temperature rose to 120° C. over a period of 2.5 hours and then left further reacting at this temperature for two hours. The resultant slurry was washed and dried. Consequently there were obtained rigid copolymers No. 3—1 to 3—3 shown in Table 4.

TABLE 4

| Hard Copolymer No. | 3-1 | 3-2 | 3-3 |
| --- | --- | --- | --- |
| Composition (parts) | | | |
| Water | 120 | 120 | 120 |
| ABS Na 1) | 0.003 | 0.003 | 0.003 |
| Acrylonitrile | 30 | 29 | 27 |
| Styrene | 70 | 6 | 23 |
| α-Methyl styrene | — | 65 | 37 |
| N-PMI 2) | — | — | 13 |
| BPO 3) | 0.7 | 0.7 | 0.7 |
| TBP 4) | 0.07 | 0.07 | 0.07 |
| TCP 5) | 0.6 | 0.6 | 0.6 |
| TDM 6) | 0.18 | 0.1 | 0.1 |
| Conversion of monomer (%) | 98 | 96 | 97 |
| Remarks | Example | Example | Example |

1) Alkylbenzene sodium sulfonate
2) N-phenyl maleimide
3) Benzoyl peroxide
4) t-Butylperoxybenzoate
5) Calcium phosphate
6) t-Dodecyl mercaptan

EXAMPLES 1 to 4 AND COMPARATIVE EXPERIMENTS 1 to 14:

The graft copolymer obtained in Production 2 and the rigid copolymer obtained in Production 3 were kneaded in varying proportions shown in Tables 5, 6, and 7 in combination with 0.5 part by weight of calcium stearate and 1.5 parts by weight of N,N'-ethylenebisstearyl amide in a Banbury mixer and injection molded at 260° C.

The shaped articles No. 4-1 to No. 4-17 consequently obtained were tested for various properties by the following conditions and procedure.

Slidability: The method B (pinion disc method) of Suzuki type friction wear test (JIS K-7218) was used, with modifications.

Gloss: The method specified in JIS Z-8741 (reflectance at an angle, 60° of incidence) was followed with necessary modifications.

Evaluation of appearance of shaped article: A given sample was visually evaluated on the following three-point scale, wherein:

◯- Absence of unevenness in flow mark and in pearly sensation of gloss.

Δ- Presence of slightly discernible unevenness in flow mark and in pearly sensation of gloss.

X - Presence of clearly discernible unevenness in flow mark and in pearly sensation of gloss.

Notched Izod impact: The procedure of ASTM D 256 was followed, with necessary modifications.

The shaped articles obtained in Examples 1 to 4 were tested for weatherability by the following procedure.

Weatherability: A given test piece was left standing for 200 hours or 400 hours in a weather meter (produced by Suga Shikenki K.K. and marketed under trademark designation of "Sunshine Super-Long Life Xenon Weathermeter WEL-6XS-HCH-B"), with a black panel temperature at 83° C (no spray), and then tested for Izod impact (determined by the procedure of ASTM D-256 at −30° C., with no notch formed in the test piece). The weatherability was evaluated based on the magnitude of impact determined as described above.

For the purpose of comparison, a general-purpose ABS resin having a rubber content of 20% by weight was similarly tested for weatherability (Comparative Experiment 14).

The results are shown in Tables 5, 6, and 7.

It is clearly noted from Tables 5 and 6 that the thermoplastic resin compositions conforming with the present invention exhibited preeminently excellent physical properties such as sliding quality, surface gloss, surface appearance, impact resistance, and weatherability in good balance.

TABLE 5

| | Example | | Comparative Experiment | | | |
| --- | --- | --- | --- | --- | --- | --- |
| Example | 1 | 2 | 1 | 2 | 3 | 4 |
| Resin Composition No. | 4-1 | 4-2 | 4-3 | 4-4 | 4-5 | 4-6 |
| Composition (parts) | | | | | | |
| Graft Copolymer No. | | | | | | |
| 2-1 | | | 35 | | | |
| 2-2 | 35 | | | | | |
| 2-3 | | 35 | | | | |
| 2-4 | | | | 35 | | |
| 2-5 | | | | | 35 | |
| 2-6 | | | | | | 35 |
| 2-7 | | | | | | |
| 2-8 | | | | | | |
| 2-9 | | | | | | |
| 2-10 | | | | | | |
| 2-11 | | | | | | |
| 2-12 | | | | | | |
| Hard Copolymer No. | | | | | | |
| 3-1 | 65 | 65 | 65 | 65 | 65 | 65 |
| 3-2 | | | | | | |
| 3-3 | | | | | | |
| Silicone type lubricant | | | | | | |
| Characteristic Properties | | | | | | |
| Slidability | | | | | | |
| Friction coefficient | | | | | | |
| 3 kgf | 0.20 | 0.12 | 0.44 | 0.15 | 0.32 | 0.33 |
| 10 kgf | 0.19 | 0.13 | 0.41 | 0.17 | 0.36 | 0.33 |
| Amount of wear (nm) | 0.02 | 0.01 | 0.42 | 0.01 | 0.20 | 0.35 |
| Gloss (%) | 92 | 96 | 87 | 96 | 91 | 82 |
| Appearance of surface | ◯ | ◯ | ◯ | Δ | ◯ | ◯ |
| Notch Izod impact strength (kg · cm/cm) | 54.2 | 52.3 | 50.5 | 27.6 | 48.6 | 51.4 |
| Weatherability (kg · cm/cm) | | | | | | |
| After 0 hour | 126 | 123 | | | | |
| After 200 hours | 72 | 74 | | | | |
| After 400 hours | 54 | 62 | | | | |

TABLE 6

| | Comparative Experiment | | | | | |
| --- | --- | --- | --- | --- | --- | --- |
| Example | 5 | 6 | 7 | 8 | 9 | 10 |
| Resin Composition No. | 4-7 | 4-8 | 4-9 | 4-10 | 4-11 | 4-12 |
| Composition (parts) | | | | | | |
| Graft Copolymer No. | | | | | | |
| 2-1 | | | | | | |
| 2-2 | | | | | | |
| 2-3 | | | | | | |
| 2-4 | | | | | | |
| 2-5 | | | | | | |

TABLE 6-continued

| | | Comparative Experiment | | | | |
|---|---|---|---|---|---|---|
| Example | 5 | 6 | 7 | 8 | 9 | 10 |
| Resin Composition No. | 4-7 | 4-8 | 4-9 | 4-10 | 4-11 | 4-12 |
| 2-6 | | | | | | |
| 2-7 | 35 | | | | | |
| 2-8 | | 35 | | | | |
| 2-9 | | | 35 | | | |
| 2-10 | | | | 35 | | |
| 2-11 | | | | | 81.7 | |
| 2-12 | | | | | | 27.2 |
| Hard Copolymer No. | | | | | | |
| 3-1 | 65 | 65 | 65 | 65 | 18.6 | 72.8 |
| 3-2 | | | | | | |
| 3-3 | | | | | | |
| Silicone type lubricant | | | | | | |
| Characteristic Properties | | | | | | |
| Slidability | | | | | | |
| Friction coefficient | | | | | | |
| 3 kgf | 0.22 | 0.21 | 0.26 | 0.28 | 0.20 | 0.24 |
| 10 kgf | 0.23 | 0.19 | 0.23 | 0.22 | 0.20 | 0.21 |
| Amount of wear (nm) | 0.03 | 0.04 | 0.17 | 0.15 | 0.03 | 0.03 |
| Gloss (%) | 73 | 84 | 94 | 43 | 88 | 76 |
| Appearance of surface | Δ | ○ | ○ | X | Δ | X |
| Notch Izod impact strength (kg · cm/cm) | 36.8 | 28.4 | 16.3 | 24.9 | 23.6 | 47.3 |
| Weatherability (kg · cm/cm) | | | | | | |
| After 0 hour | | | | | | |
| After 200 hours | | | | | | |
| After 400 hours | | | | | | |

TABLE 7

| | Example | | Comparative Experiment | | | |
|---|---|---|---|---|---|---|
| Example | 3 | 4 | 11 | 12 | 13 | 14 |
| Resin Composition No. | 4-13 | 4-14 | 4-15 | 4-16 | 4-17 | 4-18 |
| Composition (parts) | | | | | | |
| Graft Copolymer No. | | | | | | |
| 2-1 | | | 35 | | | a general purpose ABS resin 100 parts |
| 2-2 | | | | | | |
| 2-3 | 35 | 35 | | 5 | 80 | |
| 2-4 | | | | | | |
| 2-5 | | | | | | |
| 2-6 | | | | | | |
| 2-7 | | | | | | |
| 2-8 | | | | | | |
| 2-9 | | | | | | |
| 2-10 | | | | | | |
| 2-11 | | | | | | |
| 2-12 | | | | | | |
| Hard Copolymer No. | | | | | | |
| 3-1 | | | 65 | 95 | 20 | |
| 3-2 | 65 | | | | | |
| 3-3 | | 65 | | | | |
| Silicone type lubricant | | | 0.1 | | | |
| Characteristic Properties | | | | | | |
| Slidability | | | | | | |
| Friction coefficient | | | | | | |
| 3 kgf | 0.10 | 0.11 | 0.35 | 0.62 | 0.21 | 0.73 |
| 10 kgf | 0.11 | 0.12 | 0.33 | 0.65 | 0.22 | 0.75 |
| Amount of wear (nm) | 0.01 | 0.01 | 0.32 | 0.53 | 0.04 | 0.66 |
| Gloss (%) | 97 | 98 | 82 | 94 | 73 | 88 |
| Appearance of surface | ○ | ○ | Δ | ○ | X | ○ |
| Notch Izod impact strength (kg · cm/cm) | 43.3 | 41.5 | 48.6 | 12.4 | 55.6 | 32.3 |
| Weatherability (kg · cm/cm) | | | | | | |
| After 0 hour | 95 | 92 | | | 140 | |
| After 200 hours | 54 | 50 | | | 14 | |
| After 400 hours | 46 | 41 | | | 5 | |

What is claimed is:

1. A thermoplastic resin composition comprising 10 to 60 parts by weight of a graft copolymer (A) and 90 to 40 parts by weight of a rigid copolymer (B), both defined below;

(A) the graft copolymer obtained by emulsion graft polymerizing 60 to 20 parts by weight of a monomer mixture containing 60 to 76% by weight of an aromatic vinyl monomer and 40 to 24% by weight of a vinyl chanide monomer, and 40 to 80 parts by weight, as solid components, of an ethylene-propyulene-non-conjugated diene copolymer containing cross-lined latex, which includes 0.1 to 20 parts by weight of an acid-modified low molecular weight polyethylene containing 99.8 to 80% by weight of an alpha-olefin and 0.2 to 20% by weight of an unsaturated carboxylic acid compound, 100 parts by weight of the ethylene-propylene-non-conjugated diene copolymer and 0.1 to 1 parts by weight of polyhydric alcohol so that said acid-modified low molecular weight polyethylene is uniformly mixed in the ethylene-propylene-non-conjugated diene copolymer, (B) the rigid copolymer containing 60 to 76% by weight of an aromatic vinyl monomer and 40 to 24% by weight of a vinyl cyanide monomer.

2. A thermoplastic resin composition comprising 10 to 60 parts by weight of a graft copolymer (A) and 90 to 40 parts by weight of a rigid copolymer (B), both defined below;

(A) the graft copolymer obtained by emulsion graft polymerizing 60 to 20 parts by weight of a monomer mixture containing 60 to 76% by weight of an aromatic vinyl monomer and 40 to 24% by weight of a vinyl chanide monomer, and 40 to 80 parts by weight, as solid components, of an ethylene-propyulene-non-conjugated diene copolymer containing cross-lined latex, which includes 0.1 to 20 parts by weight of an acid-modified low molecular weight polyethylene containing 99.8 to 80% by weight of an alpha-olefin and 0.2 to 20% by weight of an unsaturated carboxylic acid compound, 100 parts by weight of the ethylene-propylene-non-conjugated diene copolymer and 0.1 to 1 parts by weight of polyhydric alcohol so that said acid-modified low molecular weight polyethylene is uniformly mixed in the ethylene-propylene-non-conjugated diene copolymer, (B) the rigid copolymer containing 60 to 76% by weight of an aromatic vinyl monomer and 40 to 24% by weight of a vinyl cyanide monomer. copolymerizable with said monomers.

3. A thermoplastic resin composition according to claim 1, wherein the ethylene content in said ethylene-propylene-non-conjugated diene copolymer is in the range of 80 to 90 mol %.

4. A thermoplastic resin composition according to claim 1, wherein said ethylene-propylene-non-conjugated diene copolymer-containing cross-linked latex possesses a gel content in the range of from 40 to 95% by weight and a particle diameter in the range of from 0.2 to 1 μm.

5. A thermoplastic resin composition according to claim 1, wherein said aromatic vinyl monomer is styrene, α-methylstyrene, or p-methylstyrene.

6. A thermoplastic resin composition according to claim 1, wherein said vinyl cyanide monomer is acrylonitrile or methacrylonitirle.

7. A thermoplastic resin composition according to claim 2, wherein said copolymerizable monomer is N- phenyl maleimide, a methacrylate, or methyl methacrylate.

8. A thermoplastic resin composition according to claim 1, wherein said graft copolymer consists essentially of said monomer mixture containing said aromatic vinyl monomer and said vinyl cyanide monomer, and said ethylene-propylene-non-conjugated diene copolymer containing cross-lined latex, which includes said acid-modified low molecular weight polyethylene and said polyhydric alcohol.

9. A thermoplastic resin composition according to claim 8, wherein said acid-modified polyethylene has a molecular weight of about 2,700.

10. A thermoplastic resin composition according to claim 2, wherein said acid modified polyethylene has a molecular weight of about 2,700.

* * * * *